Feb. 1, 1949. N. A. SCHASSBERGER 2,460,399
VEHICLE CLOSURE
Filed April 11, 1945 4 Sheets-Sheet 1
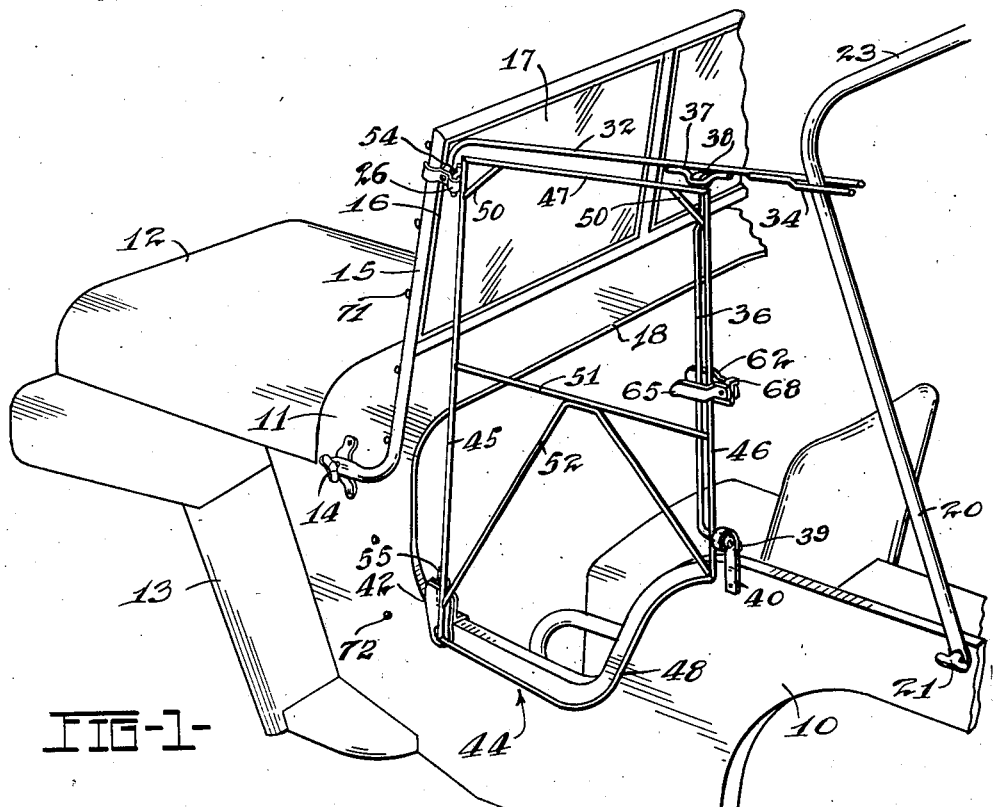
INVENTOR.
Norman A. Schassberger
BY Harry O. Ernsberger
ATTORNEY

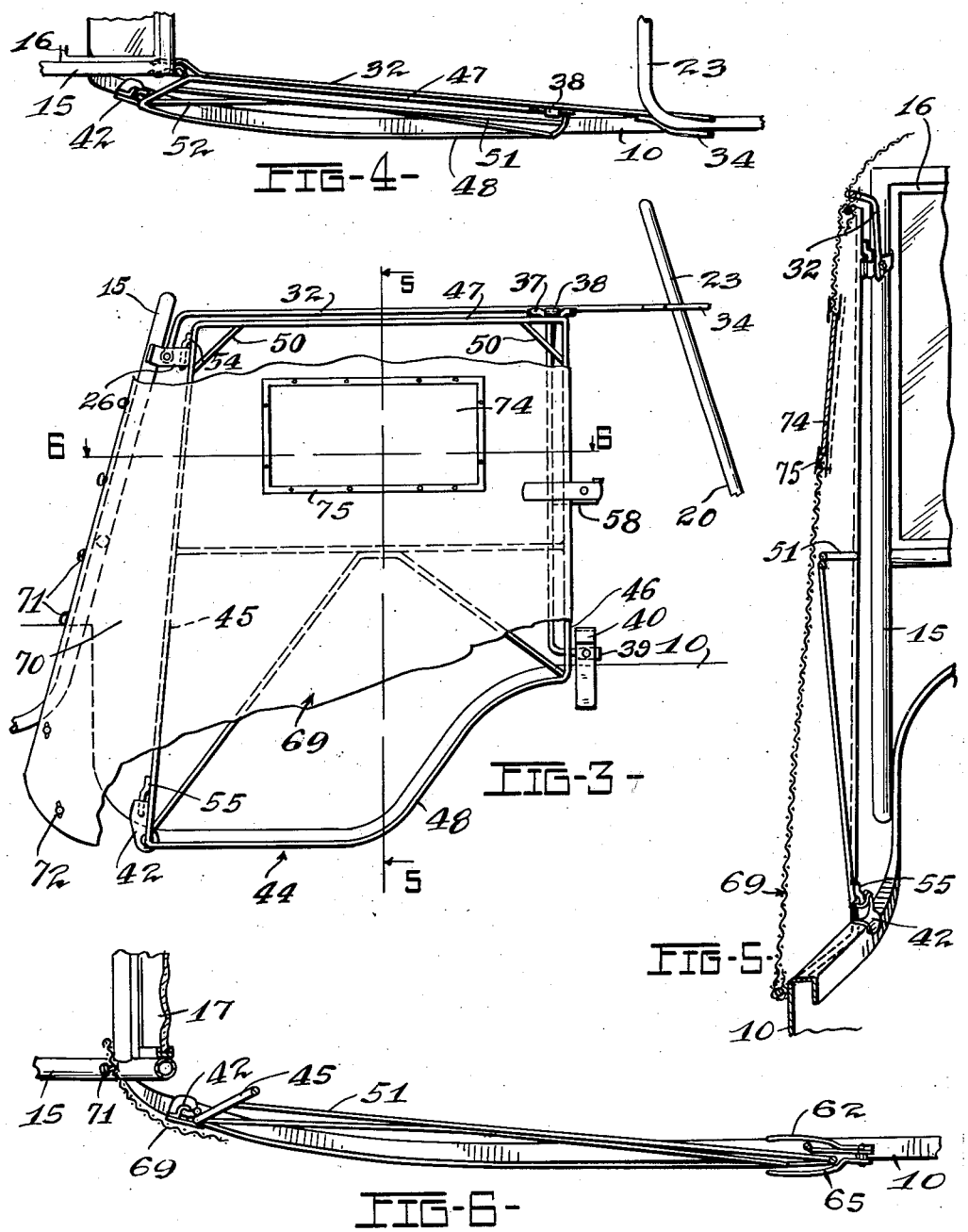

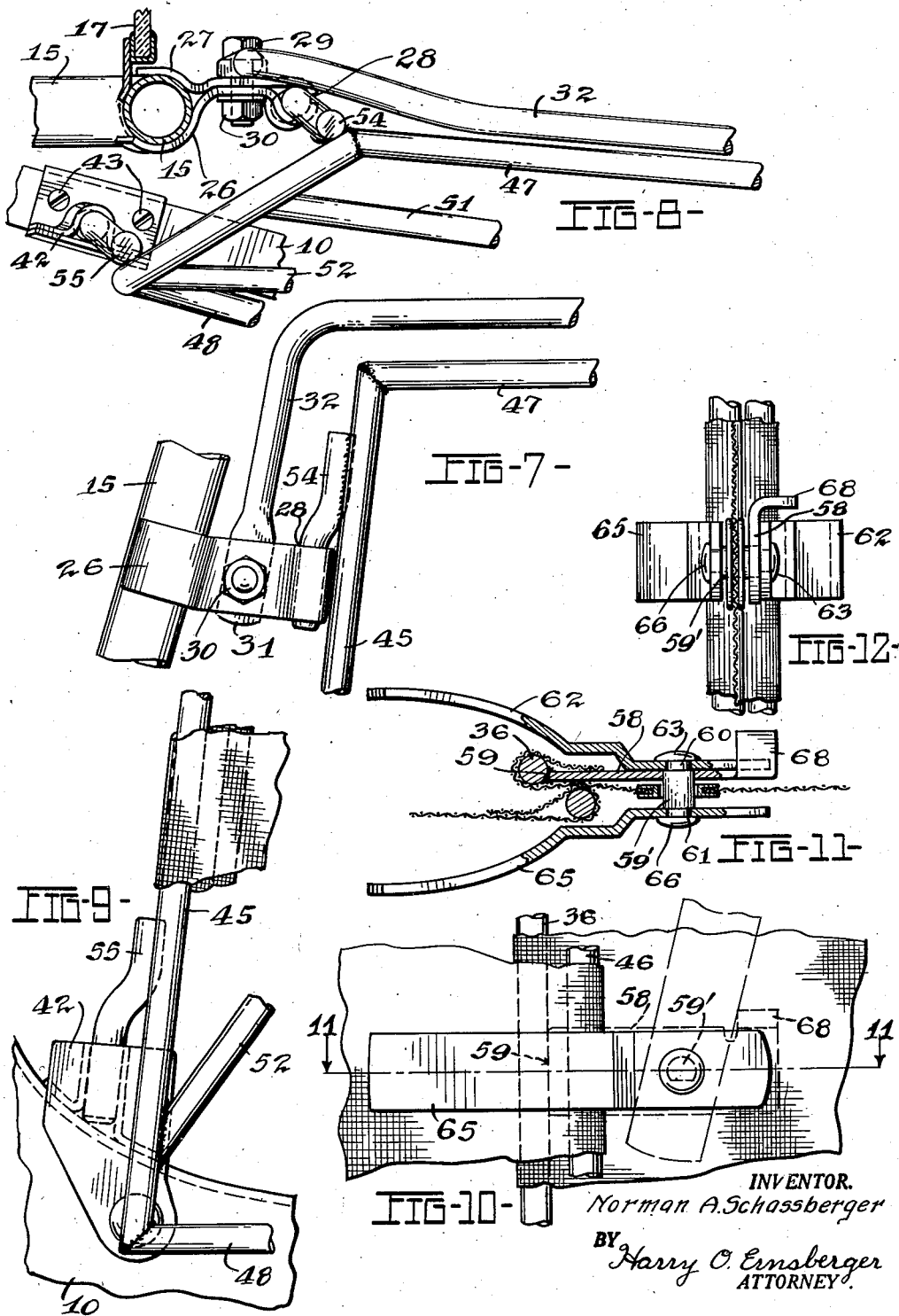

Feb. 1, 1949.   N. A. SCHASSBERGER   2,460,399
VEHICLE CLOSURE
Filed April 11, 1945   4 Sheets-Sheet 4
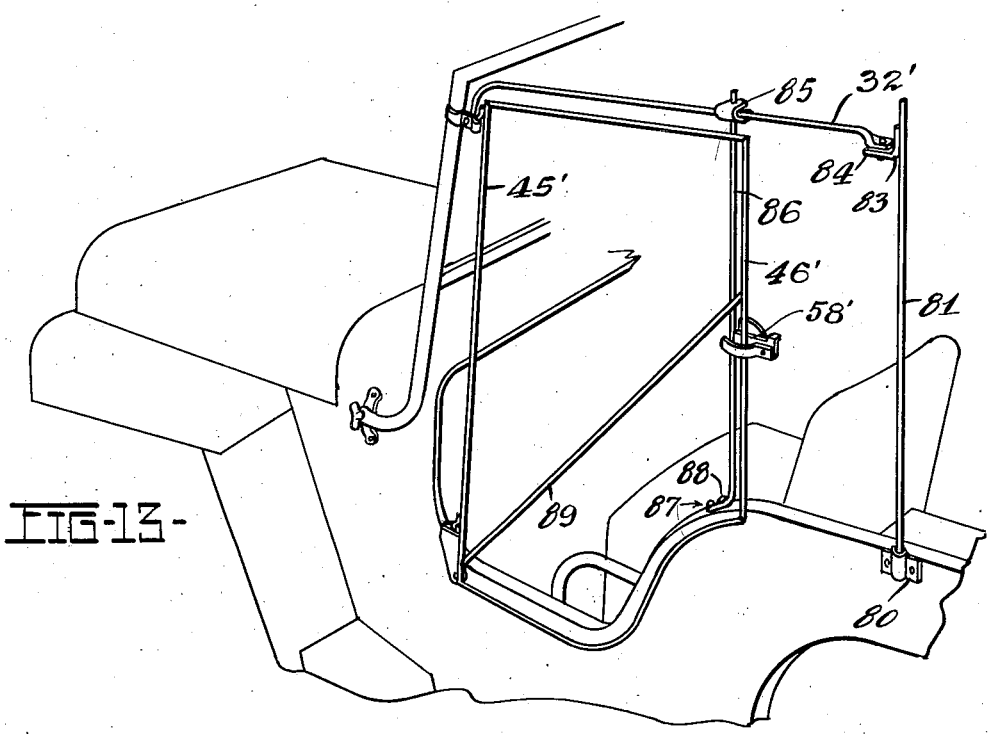
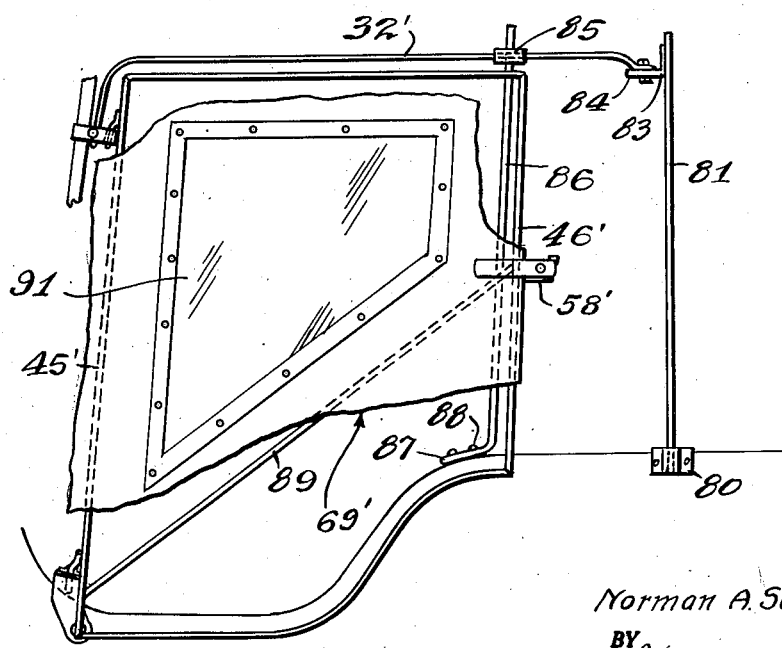
INVENTOR.
Norman A. Schassberger
BY Harry O. Ernsberger
ATTORNEY Patented Feb. 1, 1949

2,460,399

UNITED STATES PATENT OFFICE 2,460,399

VEHICLE CLOSURE

Norman A. Schassberger, Toledo, Ohio, assignor to Willys-Overland Motors, Inc., Toledo, Ohio, a corporation of Delaware Application April 11, 1945, Serial No. 587,771

5 Claims. (Cl. 296—44)

1

This invention relates to vehicle closures and more especially to a door construction and supporting means for use with the enclosure of vehicle operator's compartment.

The invention embraces the provision of a readily removable door construction having particular utility in closing the compartment occupied by the vehicle operator and of a construction which is extremely light in weight and inexpensive to manufacture.

The invention comprehends the provision of a light metal door frame preferably adapted to be covered with cloth, canvas or other flexible material and which is arranged to be quickly and easily removed from a vehicle without the use of tools.

A further object of the invention resides in the provision of a door and supporting frame construction which may be readily affixed to an open type vehicle without modifying the vehicle construction.

Another object of the invention resides in the provision of simple and inexpensive means for latching a door in closed position and for quickly releasing the door for purposes of entering or leaving the vehicle.

Further objects and advantages are within the scope of this invention such as relate to the arrangement, operation and function of the related elements of the structure to various details of construction and to combinations of parts, elements per se, and to economies of manufacture and numerous other features as will be apparent from a consideration of the specification and drawing of a form of the invention, which may be preferred, in which:

Figure 1 is a fragmentary perspective view of the vehicle body illustrating the door construction of my invention in assembled position upon the vehicle;

Figure 2 is a view similar to Figure 1 showing the door construction in open position;

Figure 3 is a side elevational view of the door construction and its supporting frame structure;

Figure 4 is a top plan view of the door frame and support construction illustrated in Figure 3;

Figure 5 is a vertical sectional view taken substantially on line 5—5 of Figure 3;

Figure 6 is a horizontal sectional view taken substantially on line 6—6 of Figure 3;

Figure 7 is a fragmentary elevational view showing the upper hinge construction forming a part of the door assembly;

Figure 8 is a top plan view of the construction shown in Figure 7;

2

Figure 9 is a fragmentary elevational view showing the lower hinge construction forming a part of the door assembly;

Figure 10 is an enlarged fragmentary elevational view showing the door latch construction;

Figure 11 is a horizontal sectional view taken substantially on line 11—11 of Figure 10;

Figure 12 is an end view of the door latch construction shown in Figure 10;

Figure 13 is a view similar to Figure 1 showing a modified form of door and supporting construction;

Figure 14 is an elevational view of the door and supporting frame construction illustrated in Figure 13.

While I have illustrated the invention as adaptable for association with a particular type of vehicle, it is to be understood that I contemplate the use of my invention with any construction wherever it may have utility as a closure.

Referring to the drawings in detail the vehicle body illustrated is inclusive of a body portion 10, a cowl portion 11, a hood or bonnet construction 12 and front fenders 13. Secured to the cowl portion 11 by winged screws 14 or other suitable means is a main windshield frame 15 having a supplemental frame 16 supporting glazed panes 17, a metallic panel portion 18 being disposed beneath the supplemental frame 16. The supplemental frame 16 is hingedly connected to the main frame 15 so as to be swung forwardly if desired. The vehicle body illustrated is adapted to be equipped with a foldable top construction which is inclusive of a forwardly extending bow strut 20 having its ends secured to the side walls of the body construction by means of winged screws 21 or other suitable means (one connection only being shown), the lower ends of the bow strut 20 being slotted to straddle the screw portions of winged members 21. The bow strut 20 is formed with a transversely extending portion 23 for supporting a flexible top (not shown) fabricated of canvas or other suitable material.

My invention is inclusive of door construction and supporting means therefor which may be quickly and readily secured to the vehicle and in which a light weight door is arranged to be quickly removable per se. Secured to the upper portion of the windshield frame 15 is a clamp means comprising members 26 and 27 formed of metal to the configurations shown in Figure 8. The rear extremities of the metal members are bent to form a socket 28 for supporting one of the door hinge pintles. The members 26 and 27 are adapted to be drawn into frictional engagement with windshield frame 15 by means of a bolt 29 and nut 30 which passes through openings in the juxtaposed portions of the members and through an opening in the flattened end 31 of a rod 32. The rod 32 extends rearwardly of the windshield frame 15 and welded near its rearmost extremity is a short rod 34 having a portion spaced from rod 32 and forming therewith a furcation in which is received an upright portion of the top bow 20 as shown in Figure 1. Thus member 32 provides an upper door rail and serves to form an anchor for a vertically disposed door post or rod 36. Secured to the horizontal portion of rod 32 is a bracket 37 formed of a short length of rod the extremities of which are welded to the rod 32. The central portion of bracket 37 is spaced from the rod 32 and forms a pintle about which is looped the upper flattened extremity 38 of rod 36. The lower end of rod 36 is flattened and bent rearwardly to form a pad portion 39 which is bolted to a cleat or bracket 40, the latter forming a means to receive an end of top bow 20 when the top construction is stored in an "out-of-use" position. A lower hinge socket is provided for the door construction, and is formed of two metal members which are welded together forming a socket member 42, the same being secured to the upper wall of the body as shown in Figures 1 and 2 and is secured thereto by means of screws 43 as shown Figure 8.

The door construction of my invention is inclusive of a skeleton frame 44 formed of metal rods, tubing or the like, there being vertical upright portions 45—46, an upper rail 47 and a lower rail 48, the latter being configurated to conform generally to the contour of the body adjacent the lower portion of the door frame. The frame construction is reinforced at its upper portion by means of gussets 50 and further reinforced by means of a horizontal extending bar 51 and an angularly shaped member or rod 52, the latter being welded to the transverse bar 51 at the point of juncture therewith as shown in Figures 1 and 2. The several elements of the skeleton door frame are preferably formed of round rods or bars and are welded together to form the proper configuration. Welded to the upright member 45 adjacent the top and bottom thereof are the members 54 and 55, both members having portions spaced from the rod 45 to form hinge pintles arranged to be received in the loop or socket 28 formed by members 26, 27 and the lower socket 42. Thus the door is arranged to swing about an axis in alignment with the centers of pintles formed on members 54 and 55.

A latching means for the door construction is provided, including a metal member 58 which is welded as at 59 to the rod 36 and projects rearwardly therefrom. An opening is drilled in member 58 to receive a pin 59', the pin being formed with reduced tenon portions 60 and 61 of non circular configuration. A handle portion 62 disposed on the inside of the door construction is carried by the tenon portion 60, the handle being held in place by a swaged portion 63 of pin 59'. A second handle portion 65 disposed outside of the door is secured upon tenon portion 61 held in place by swaged portion 66. Thus movement of either handle 62 or 65 moves both handles and pin 59' as a unit about the axis of the latter. The member 58 is provided with an abutment 68 which forms a stop means for holding the handles 62 and 65 in horizontal position, thus latching the door in closed position. Abutment 68 is also adapted to limit the position of handles 62 and 65 when they are moved to the position shown in Figure 2 to release or unlatch the door construction.

The canvas construction of the vehicle top is secured to the bar 32 to anchor the forward side portions of the top covering. Skeleton door frame of my invention is formed by the metal rods and defines the perimeter of the door, the area defined by the frame being preferably covered by means of a fabric panel of canvas 69 or some other suitable flexible material as shown in Figure 3, the canvas covering being permanently seamed or secured to the skeleton door frame hereinbefore described. The flexible panel 69 has a forwardly extending portion 70 which is adapted to fold around the windshield upright 15 and is secured by means of releasable standard type curtain fasteners 71, the lower part of the door covering being secured by fasteners 72 to the vehicle body. The canvas door covering or panel is formed with a window opening in which is disposed a transparent pane 74 which may be formed of plastic, Celluloid or other suitable material. The transparent pane 74 may be held in place by means of metal strips 75 which are secured together by screws or other suitable means passing through the canvas portions bounding the window opening.

It will be noted that if it is desirable to remove the door construction, this may be readily and quickly accomplished by releasing the canvas door cover from the curtain fasteners 71 and 72 and elevating the door construction until the pintles or hinge pins formed of members 54 and 55 are withdrawn from the hinge sockets formed by members 26, 27 and in member 42, such vertical movement of the door completely disconnecting the same from the vehicle.

Figures 13 and 14 illustrate a modified form of the invention which is particularly adaptable for use with a vehicle top of different construction. A socket 80 is secured to each side of the vehicle and is arranged to receive an upwardly extending bow strut 81 for supporting the vehicle top covering (not shown). Welded to the top bow strut 81 is a bracket 83 having a forwardly extending pad portion 84 upon which rests the flattened extremity of the rail 32'. Welded to the bar 32' intermediate its ends is a U-shaped clip or bracket 85 having its opposed wall portions bored to receive the upper end of a vertically arranged post or bar 86, the lower end of the bar being flattened as at 87 and secured to the body by means of bolts 88. In this form of the invention, the bar 86 functions in the same manner as the bar 36 in the previously described form of the invention. The latching device is of the same construction as hereinbefore described, the bracket 58' thereof being welded to the bar 86.

The door frame construction is of modified form in which the uprights 45' and 46' are joined by means of a diagonally disposed strut 89 in order to facilitate the incorporation of a glazed window 91 of the configuration shown in Figure 14 formed in the door covering 69'. In other major respects the constructions of both forms of invention are substantially identical.

It is apparent that, within the scope of the invention, modifications and different arrangements may be made other than is herein disclosed, and the present disclosure is illustrative merely, the invention comprehending all variations thereof.

What I claim is:

1. In combination; a vehicle body having a windshield frame; a vertical strut secured to the body; a substantially horizontal top rail disposed between said strut and the windshield frame; hinge sockets secured to said body and windshield frame; a removable door including a skeleton metallic frame; a plurality of hinge pins welded to the metallic door frame and adapted to be received in said hinge sockets; a flexible fabric covering secured to said door frame, and latch means pivotally secured to said strut for retaining said door in closed position.

2. In combination a vehicle body having a windshield frame; a vertical strut secured to the body; a substantially horizontal top rail disposed between said strut and the windshield frame; hinge sockets secured to said body and windshield frame; a removable door including a skeleton metallic frame formed of metal bars of circular cross section welded together; a plurality of hinge pins welded to the metallic door frame and adapted to be received in the hinge sockets; a fabric covering secured to said door frame; said fabric covering having a window opening; a pane of transparent material disposed in said opening; and latch means pivotally secured to said strut for retaining said door in closed position.

3. A light weight door for vehicles including, in combination, a metallic skeleton frame; said frame being formed of spaced pillars; top and bottom rails welded to said pillars; a reinforcing strut extending across the area defined by said frame and secured to said pillars; hinge means for supporting the door including a pair of members; each of said members having a portion welded to one of said pillars; said members having offset portions arranged in parallelism with the pillar supporting said members, said offset portions forming hinge pintles for said door, and a covering of flexible material secured to the metallic frame.

4. A light weight door for vehicles including, in combination, a skeleton metallic frame; said frame including spaced pillars; top and bottom rails welded to said pillars; a pair of members; said members being of circular cross section and having portions thereof welded to one of said pillars; each of said members having an offset portion arranged in parallelism with the pillar to which it is secured; said offset portions forming hinge pintles for hingedly and removably securing said door to a vehicle, and a covering of flexible material secured to the metallic frame.

5. In combination with a vehicle body provided with a pair of hinge sockets; a removable door including a skeleton metallic frame; said door frame including a pillar; a pair of members secured to said pillar; said members having offset portions of circular cross section; said offset portions being arranged in parallelism with said pillar and adapted to be removably received into the hinge sockets whereby said door is hingedly supported upon the vehicle body; a panel of flexible material secured to the door frame; a substantially vertical strut mounted upon said vehicle body, and latch means mounted upon said vertical strut and adapted for cooperation with said door to retain the door in closed position.

NORMAN A. SCHASSBERGER.

REFERENCES CITED

The following references are of record in the file of this patent:

UNITED STATES PATENTS

| Number | Name | Date |
|---|---|---|
| 941,068 | Frame et al. | Nov. 23, 1909 |
| 981,771 | Kretz | Jan. 17, 1911 |
| 1,253,618 | McGraw | Jan. 15, 1918 |
| 1,362,415 | Goss | Dec. 14, 1920 |
| 1,464,400 | Ambus | Aug. 7, 1923 |
| 1,485,398 | Ledwinka | Mar. 4, 1924 |
| 1,537,959 | Morine | May 19, 1925 |
| 1,585,376 | Crawford | May 18, 1926 |
| 2,279,572 | Kann | Apr. 14, 1942 |

FOREIGN PATENTS

| Number | Country | Date |
|---|---|---|
| 651,083 | France | Oct. 8, 1928 |